United States Patent
Cho et al.

(10) Patent No.: US 10,657,402 B2
(45) Date of Patent: May 19, 2020

(54) ELECTRONIC DEVICE AND METHOD FOR IDENTIFYING SENSOR POSITION BY USING PIXELS OF DISPLAY

(71) Applicant: Samsung Electronics Co., Ltd., Suwon-si, Gyeonggi-do (KR)

(72) Inventors: Sung Cho, Yongin-si (KR); Ohhyuck Kwon, Yongin-si (KR); Hyungdal Kim, Yongin-si (KR); Heungsik Shin, Yongin-si (KR); Jiwoong Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 258 days.

(21) Appl. No.: 15/904,111

(22) Filed: Feb. 23, 2018

(65) Prior Publication Data

US 2018/0247143 A1 Aug. 30, 2018

(30) Foreign Application Priority Data

Feb. 24, 2017 (KR) .................. 10-2017-0025052

(51) Int. Cl.
*G06K 9/00* (2006.01)
*G06F 21/36* (2013.01)
*H04L 29/06* (2006.01)
*G06K 9/60* (2006.01)

(52) U.S. Cl.
CPC ......... *G06K 9/00912* (2013.01); *G06F 21/36* (2013.01); *G06K 9/0004* (2013.01); *G06K 9/00013* (2013.01); *G06K 9/60* (2013.01); *H04L 63/0861* (2013.01)

(58) Field of Classification Search
CPC .......... G06K 9/00912; G06K 9/00013; G06K 9/0004; G06K 9/60; G06K 9/00892; G06F 21/36; G06F 3/0488; H04L 63/0861
USPC .................................. 382/124–127
See application file for complete search history.

(56) References Cited

U.S. PATENT DOCUMENTS

| 5,852,670 | A | 12/1998 | Setlak et al. |
| 2002/0085739 | A1 | 7/2002 | Ertl et al. |
| 2007/0222998 | A1 | 9/2007 | Sasaki et al. |
| 2011/0299740 | A1* | 12/2011 | Mori ............ A61B 5/0059 382/115 |

FOREIGN PATENT DOCUMENTS

EP 1049046 A1 11/2000

OTHER PUBLICATIONS

European Search Report dated Jun. 1, 2018 in connection with European Patent Application No. 18 15 8119.
Office Action in connection with European Application No. 18158119.0 dated Apr. 3, 2020, 8 pages.

* cited by examiner

*Primary Examiner* — Andrew M Moyer

(57) ABSTRACT

According to various embodiments of the present disclosure, an electronic device includes a display, a biometric sensor disposed in the display, and a processor electrically connected to the display and the biometric sensor. The processor is configured to activate a pixel included in the display, acquire position information corresponding to the pixel through the biometric sensor, and identify a position of the biometric sensor disposed in the display based on the position information. Other embodiments are disclosed.

20 Claims, 20 Drawing Sheets

ELECTRONIC DEVICE AND METHOD FOR IDENTIFYING SENSOR POSITION BY USING PIXELS OF DISPLAY

CROSS-REFERENCE TO RELATED APPLICATION AND CLAIM OF PRIORITY

This application is related to and claims priority to Korean Patent Application No. 10-2017-0025052, filed on Feb. 24, 2017, the contents of which are incorporated herein by reference.

TECHNICAL FIELD

Various embodiments of the present disclosure relate to an electronic device and, more particularly, to a method for identifying a position of a biometric sensor equipped in the electronic device by using pixels of a display of the electronic device.

BACKGROUND

With the growth of mobile communication technologies and processor technologies, electronic devices (e.g., a mobile terminal device) may perform a great variety of functions beyond a traditional telephone function. For example, various applications such as an Internet browser, a game, and a calculator have been developed and used in electronic devices. As many functions have become available in electronic devices, security for information stored in the electronic devices has become more important. To meet such security needs, authentication techniques based on a user's biometric information are being developed.

Authentication techniques based on biometric information may include a process of acquiring a user's biometric information, e.g., information on a fingerprint, an iris, a voice, a face, or a blood vessel, and then comparing the acquired biometric information with preregistered biometric information to determine whether the user is an authenticated user. Among techniques based on the above exemplified biometric information, fingerprint recognition technique, for various reasons such as convenience, security, and economy, has been the technique most commercialized.

A biometric sensor such as a fingerprint sensor may be manufactured as a single module including a transmitter (e.g., an ultrasonic oscillator or an IR LED) and a receiver, and it may be embedded in an electronic device. The user may touch a part of the body to a portion of the electronic device such as a display, a button, or a housing, and the biometric sensor may acquire biometric information based on this touch.

Meanwhile, internal components of the electronic device may be changed in position because of a physical impact or other reasons while the electronic device is being used. The same may be applied to a case of the biometric sensor. In this case, it may be difficult to acquire accurate biometric information because of an unexpected change in position.

SUMMARY

To address the above-discussed deficiencies, it is a primary object to provide prevention of a wrong operation of a biometric sensor embedded in an electronic device by measuring a change in position (or misalignment) of the biometric sensor.

According to various embodiments of the present disclosure, an electronic device may comprise a display, a biometric sensor disposed in the display, and a processor electrically connected to the display and the biometric sensor. The processor may be configured to activate a pixel included in the display, to acquire position information corresponding to the pixel through the biometric sensor, and to identify a position of the biometric sensor disposed in the display based on the position information.

According to various embodiments of the present disclosure, a method for identifying a position of a biometric sensor in an electronic device comprises activating a pixel included in a display; acquiring position information corresponding to the pixel through the biometric sensor; and identifying the position of the biometric sensor disposed in the display based on the position information.

According to various embodiments of the present disclosure, an electronic device may comprise a display, a biometric sensor disposed under the display, a memory, and a processor electrically connected to the display, the biometric sensor, and the memory. The processor is configured to activate one or more pixels of the display based on reference information previously stored in the memory, to acquire an image including the one or more pixels by using the biometric sensor, and to identify a position of the biometric sensor by comparing an image acquired by the biometric sensor with a reference image corresponding to the reference information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
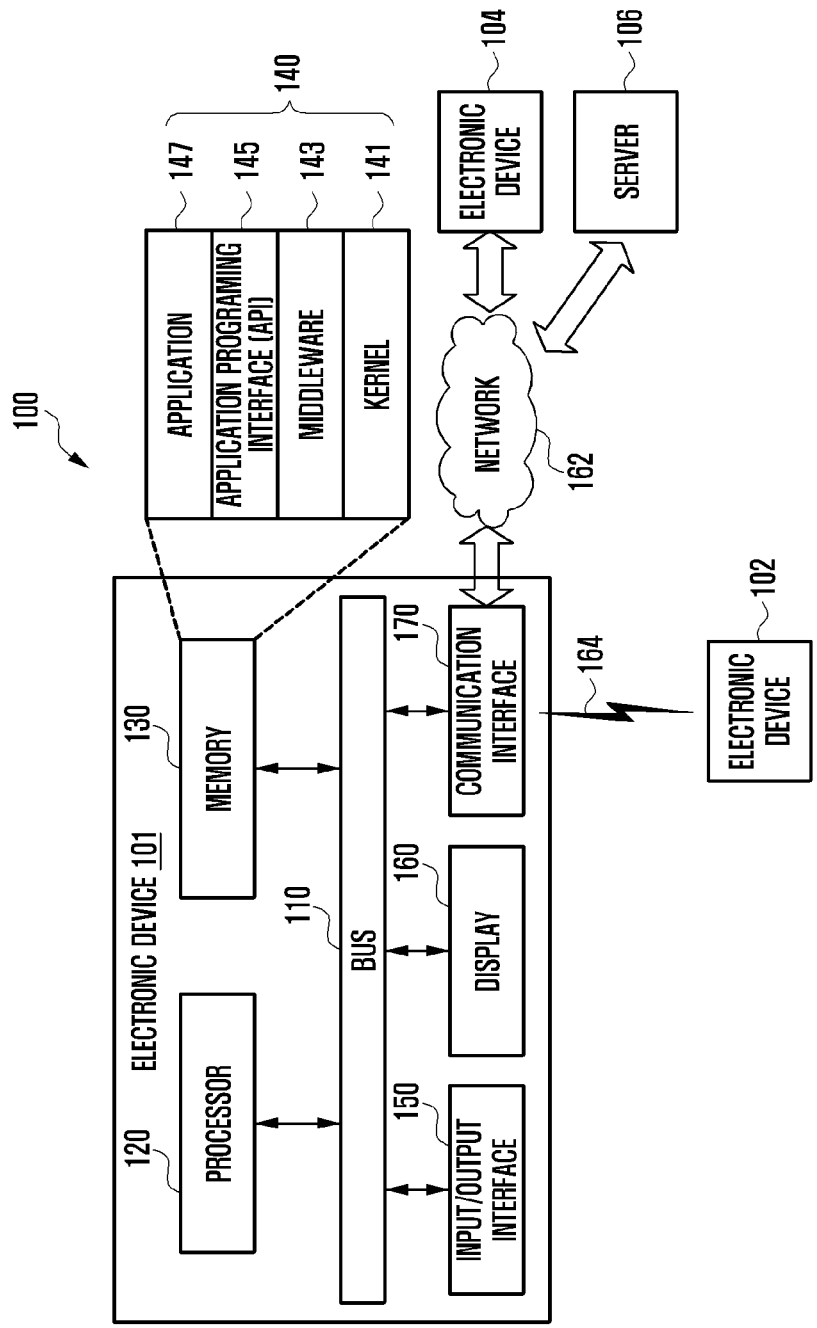
FIG. 1 is a diagram illustrating a network environment including an electronic device according to various embodiments of the present disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, example embodiments of the present disclosure are described in greater detail with reference to the accompanying drawings. While the present disclosure may be embodied in many different forms, specific embodiments of the present disclosure are illustrated in drawings and are described herein in detail, with the understanding that the present disclosure is to be considered as an example of the principles of the disclosure and is not intended to limit the disclosure to the specific embodiments illustrated. The same reference numbers are used throughout the drawings to refer to the same or like parts.

An expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, step, operation, element, component, or combination thereof described in the disclosure and does not exclude presence or addition of at least one other characteristic, numeral, step, operation, element, component, or combination thereof.

In the present disclosure, an expression "or" includes any combination or the entire combination of together listed words. For example, "A or B" may include A, B, or A and B.

An expression of a first and a second in the present disclosure may represent various elements of the present disclosure, but do not limit corresponding elements. For example, the expression does not limit order and/or importance of corresponding elements. The expression may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used in the present disclosure are not to limit the present disclosure but to illustrate example embodiments. When using in a description of the present disclosure and the appended claims, a singular form includes a plurality of forms unless it is explicitly differently represented.

Unless differently defined, entire terms including a technical term and a scientific term used here have the same meaning as a meaning that may be generally understood by a person of common skill in the art. It should be understood that generally using terms defined in a dictionary have a meaning corresponding to that of a context of related technology and are not analyzed as an ideal or excessively formal meaning unless explicitly defined.

In this disclosure, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic accessory, or a smart watch), or the like, but is not limited thereto.

According to some embodiments, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to some embodiments, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FDR (Flight Data Recorder), a car infotainment device, electronic equipment for ship (e.g., a marine navigation system, a gyrocompass, etc.), avionics, security equipment, or an industrial or home robot, or the like, but is not limited thereto.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.), or the like, but is not limited thereto. An electronic device disclosed herein may be one of the above-mentioned devices or any combination thereof. As well understood by those skilled in the art, the above-mentioned electronic devices are examples only and not to be considered as a limitation of this disclosure.

FIG. 1 is a block diagram illustrating an example electronic apparatus in a network environment according to an example embodiment of the present disclosure.

Referring to FIG. 1, the electronic apparatus 101 may include a bus 110, a processor (e.g., including processing circuitry) 120, a memory 130, an input/output interface (e.g., including input/output circuitry) 150, a display 160, and a communication interface (e.g., including communication circuitry) 170.

The bus 110 may be a circuit for interconnecting elements described above and for allowing a communication, e.g. by transferring a control message, between the elements described above.

The processor 120 can receive commands from the above-mentioned other elements, e.g. the memory 130, the input/output interface 150, the display 160, and the communication interface 170, through, for example, the bus 110, can decipher the received commands, and perform operations and/or data processing according to the deciphered commands.

The memory 130 can store commands received from the processor 120 and/or other elements, e.g. the input/output interface 150, the display 160, and the communication interface 170, and/or commands and/or data generated by the processor 120 and/or other elements. The memory 130 may include softwares and/or programs 140, such as a kernel 141, middleware 143, an Application Programming Interface (API) 145, and an application 147. Each of the programming modules described above may be configured by software, firmware, hardware, and/or combinations of two or more thereof.

The kernel 141 can control and/or manage system resources, e.g. the bus 110, the processor 120 or the memory 130, used for execution of operations and/or functions implemented in other programming modules, such as the middleware 143, the API 145, and/or the application 147. Further, the kernel 141 can provide an interface through which the middleware 143, the API 145, and/or the application 147 can access and then control and/or manage an individual element of the electronic apparatus 101.

The middleware 143 can perform a relay function which allows the API 145 and/or the application 147 to communicate with and exchange data with the kernel 141. Further, in relation to operation requests received from at least one of an application 147, the middleware 143 can perform load balancing in relation to the operation requests by, for example, giving a priority in using a system resource, e.g. the bus 110, the processor 120, and/or the memory 130, of the electronic apparatus 101 to at least one application from among the at least one of the application 147.

The API 145 is an interface through which the application 147 can control a function provided by the kernel 141 and/or the middleware 143, and may include, for example, at least one interface or function for file control, window control, image processing, and/or character control.

The input/output interface 150 may include various input/output circuitry and can receive, for example, a command and/or data from a user, and transfer the received command and/or data to the processor 120 and/or the memory 130 through the bus 110. The display 160 can display an image, a video, and/or data to a user.

The communication interface 170 can establish a communication between the electronic apparatus 101 and another electronic devices 102 and 104 and/or a server 106. The communication interface 170 can support short range communication protocols 164, e.g. a Wireless Fidelity (WiFi) protocol, a BlueTooth (BT) protocol, and a Near Field Communication (NFC) protocol, communication networks, e.g. Internet, Local Area Network (LAN), Wire Area Network (WAN), a telecommunication network, a cellular network, and a satellite network, or a Plain Old Telephone Service (POTS), or any other similar and/or suitable communication networks, such as network 162, or the like. Each of the electronic devices 102 and 104 may be a same type and/or different types of electronic apparatus.

Figure 2:
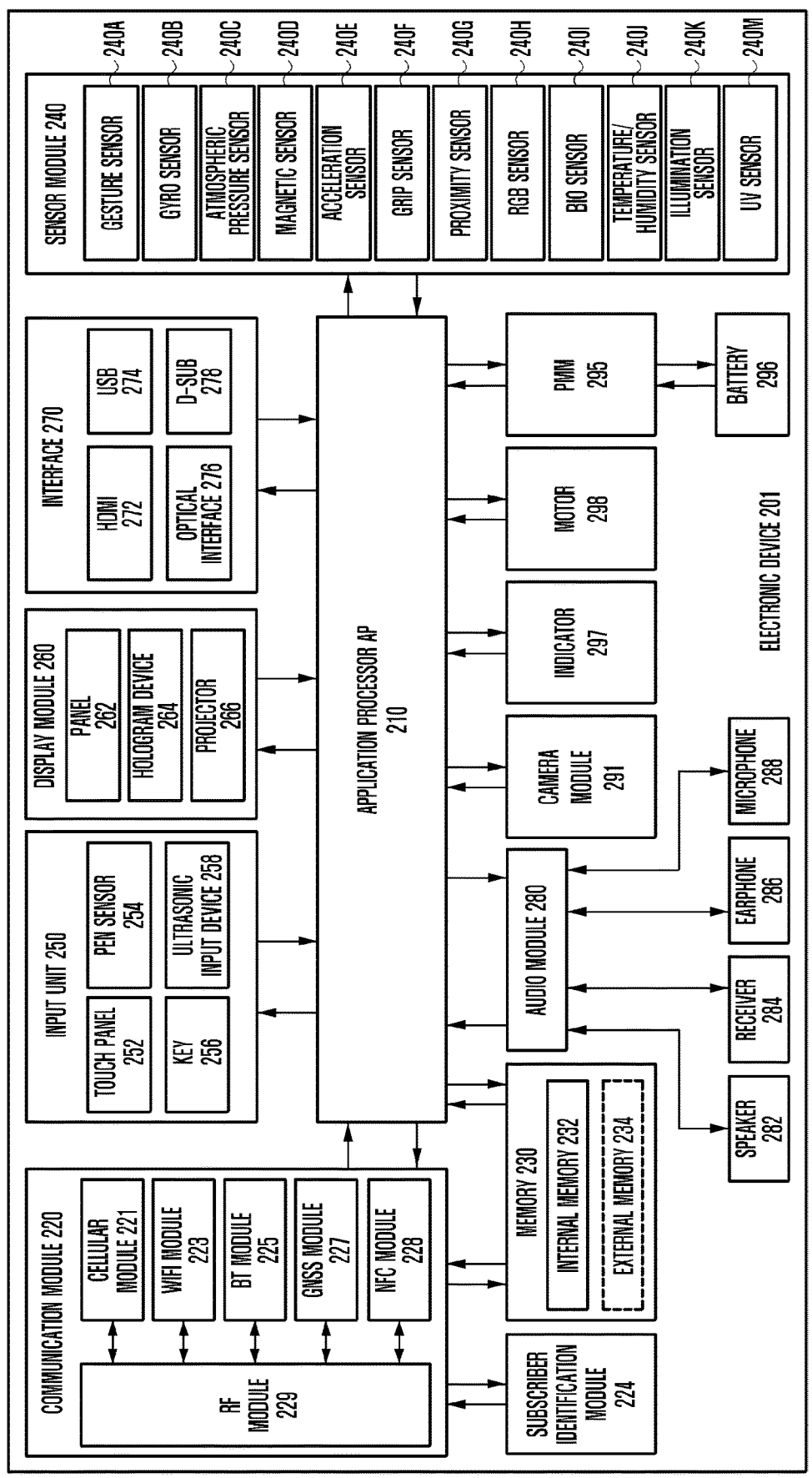
FIG. 2 is a block diagram illustrating an electronic device according to various embodiments of the present disclosure.

FIG. 2 is a block diagram illustrating an example electronic device 201 in accordance with an example embodiment of the present disclosure. The electronic device 201 may form, for example, the whole or part of the electronic device 101 shown in FIG. 1. Referring to FIG. 2, the electronic device 201 may include at least one application processor (AP) (e.g., including processing circuitry) 210, a communication module (e.g., including communication circuitry) 220, a subscriber identification module (SIM) card 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The AP 210 may include various processing circuitry, and drive an operating system or applications, control a plurality of hardware or software components connected thereto, and also perform processing and operation for various data including multimedia data. The AP 210 may be formed of system-on-chip (SoC), for example. According to an embodiment, the AP 210 may further include a graphic processing unit (GPU) (not shown).

The communication module 220 (e.g., the communication interface 170) may perform a data communication with any other electronic device (e.g., the electronic device 104 or the server 106) connected to the electronic device 101 (e.g., the electronic device 201) through the network. According to an embodiment, the communication module 220 may include various communication circuitry, such as, for example, and without limitation, a cellular module 221, a WiFi module 223, a BT module 225, a GPS module 227, an NFC module 228, and an RF (Radio Frequency) module 229.

The cellular module 221 may offer a voice call, a video call, a message service, an internet service, or the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM card 224. According to an embodiment, the cellular module 221 may perform at least part of functions the AP 210 can provide. For example, the cellular module 221 may perform at least part of a multimedia control function.

According to an embodiment, the cellular module 221 may include a communication processor (CP). Additionally, the cellular module 221 may be formed of SoC, for example. Although some elements such as the cellular module 221 (e.g., the CP), the memory 230, or the power management module 295 are shown as separate elements being different from the AP 210 in FIG. 2, the AP 210 may be formed to have at least part (e.g., the cellular module 221) of the above elements in an embodiment.

According to an embodiment, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS module 227 and the NFC module 228 may include a processor for processing data transmitted or received therethrough. Although FIG. 2 shows the cellular module 221, the WiFi module 223, the BT module 225, the GPS module 227 and the NFC module 228 as different blocks, at least part of them may be contained in a single IC (Integrated Circuit) chip or a single IC package in an embodiment. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC.

The RF module 229 may transmit and receive data, e.g., RF signals or any other electric signals. Although not shown, the RF module 229 may include a transceiver, a PAM (Power Amp Module), a frequency filter, an LNA (Low Noise Amplifier), or the like. Also, the RF module 229 may include any component, e.g., a wire or a conductor, for transmission of electromagnetic waves in a free air space. Although FIG. 2 shows that the cellular module 221, the WiFi module 223, the BT module 225, the GPS module 227 and the NFC module 228 share the RF module 229, at least one of them may perform transmission and reception of RF signals through a separate RF module in an embodiment.

The SIM card 224 may be a specific card formed of SIM and may be inserted into a slot formed at a certain place of the electronic device 201. The SIM card 224 may contain therein an ICCID (Integrated Circuit Card IDentifier) or an IMSI (International Mobile Subscriber Identity).

The memory 230 (e.g., the memory 230) may include an internal memory 232 and/or an external memory 234. The internal memory 232 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an embodiment, the internal memory 232 may have the form of an SSD (Solid State Drive). The external memory 234 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 234 may be functionally connected to the electronic device 201 through various interfaces. According to an embodiment, the electronic device 201 may further include a storage device or medium such as a hard drive.

The sensor module 240 may measure physical quantity or sense an operating status of the electronic device 201, and then convert measured or sensed information into electric signals. The sensor module 240 may include, for example, at least one of a gesture sensor 240A, a gyro sensor 240B, an atmospheric (e.g., barometer) sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature-humidity sensor 240J, an illumination (e.g., illuminance/light) sensor 240K, and a UV (ultraviolet) sensor 240M. Additionally or alternatively, the sensor module 240 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 240 may include a control circuit for controlling one or more sensors equipped therein.

The input device 250 may include various input circuitry, such as, for example, and without limitation, a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 201 through an input tool that generates ultrasonic signals, thus allowing wireless recognition. According to an embodiment, the electronic device 201 may receive a user input from any external device (e.g., a computer or a server) connected thereto through the communication module 220.

The display 260 (e.g., the input device 250) may include a panel 262, a hologram 264, or a projector 266. The panel 262 may be, for example, LCD (Liquid Crystal Display), AM-OLED (Active Matrix Organic Light Emitting Diode), or the like. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 201. According to an embodiment, the display 260 may further include a control circuit for controlling the panel 262, the hologram 264, and the projector 266.

The interface 270 may include various interface circuitry, such as, for example, and without limitation, an HDMI (High-Definition Multimedia Interface) 272, a USB (Universal Serial Bus) 274, an optical interface 276, or a D-sub (D-subminiature) 278. The interface 270 may be contained, for example, in the communication module 220 shown in FIG. 2. Additionally or alternatively, the interface 270 may include, for example, an MHL (Mobile High-definition Link) interface, an SD (Secure Digital) card/MMC (Multi-Media Card) interface, or an IrDA (Infrared Data Association) interface.

The audio module 280 may perform a conversion between sounds and electric signals. The audio module 280 may process sound information inputted or outputted through a speaker 282, a receiver 284, an earphone 286, or a microphone 288.

The camera module 291 is a device capable of obtaining still images and moving images. According to an embodiment, the camera module 291 may include at least one image sensor (e.g., a front sensor or a rear sensor), a lens (not shown), an ISP (Image Signal Processor, not shown), or a flash (e.g., LED or xenon lamp, not shown).

The power management module 295 may manage electric power of the electronic device 201. Although not shown, the power management module 295 may include, for example, a PMIC (Power Management Integrated Circuit), a charger IC, or a battery or fuel gauge.

The PMIC may be formed, for example, of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of its part (e.g., the AP 210). The motor 298 may convert an electric signal into a mechanical vibration. Although not shown, the electronic device 201 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of a dedicated processor, a CPU, an ASIC (Application-Specific Integrated Circuit) chip, FPGAs (Field-Programmable Gate Arrays), and programmable-logic device, which have been known or are to be developed.

Figure 3:
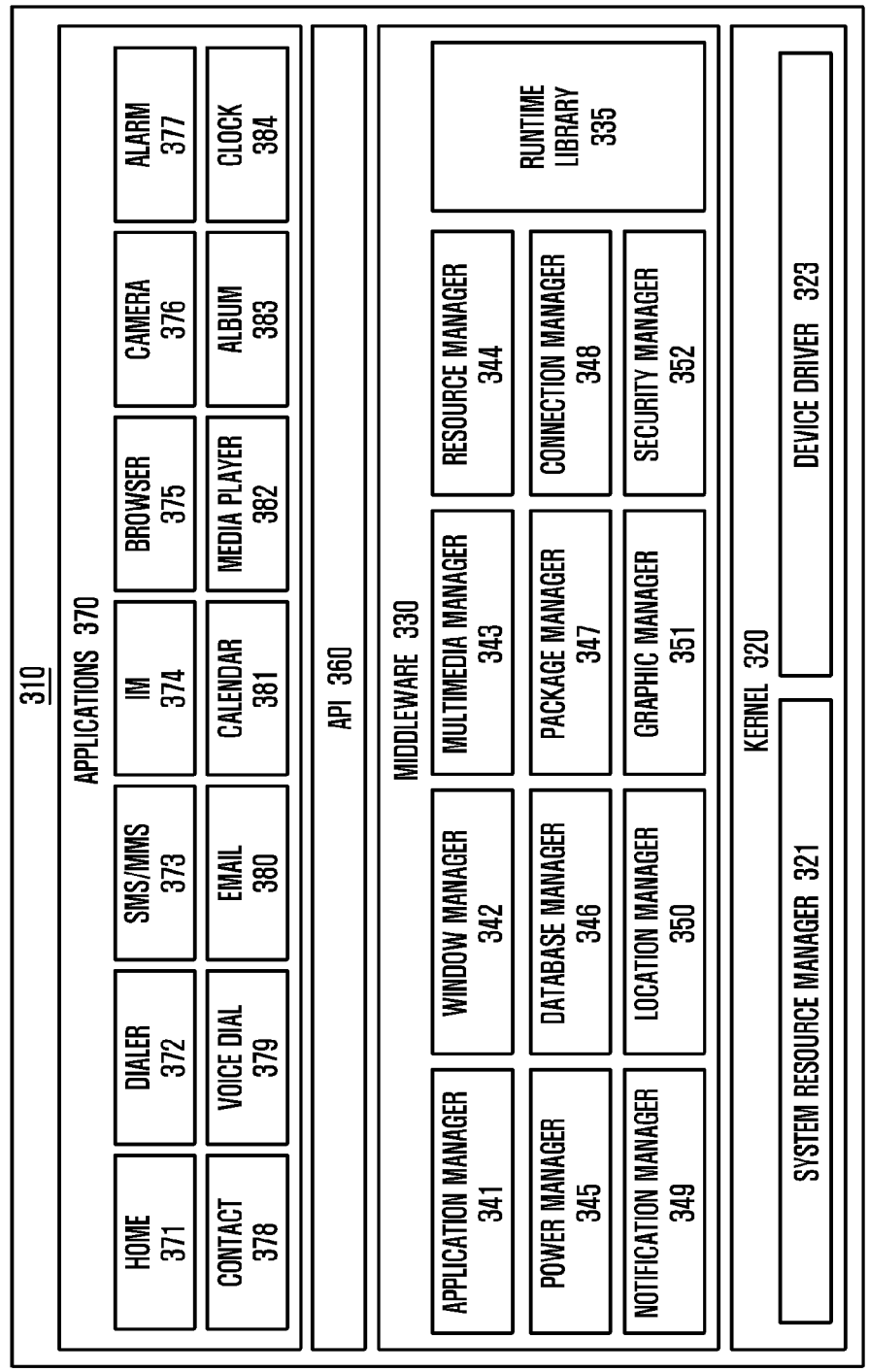
FIG. 3 is a block diagram illustrating a program module according to various embodiments of the present disclosure.

FIG. 3 is a block diagram illustrating an example configuration of a programming module 310 according to an example embodiment of the present disclosure.

The programming module 310 may be included (or stored) in the electronic device 201 (e.g., the memory 230) illustrated in FIG. 2 or may be included (or stored) in the electronic device 101 (e.g., the memory 130) illustrated in FIG. 1. At least a part of the programming module 310 may be implemented in software, firmware, hardware, or a combination of two or more thereof. The programming module 310 may be implemented in hardware, and may include an OS controlling resources related to an electronic device (e.g., the electronic device 101 or 201) and/or various applications (e.g., an application 370) executed in the OS. For example, the OS may be Android, iOS, Windows, Symbian, Tizen, Bada, and the like.

Referring to FIG. 3, the programming module 310 may include a kernel 320, a middleware 330, an API 360, and/or the application 370.

The kernel 320 (e.g., the kernel 141) may include a system resource manager 321 and/or a device driver 323. The system resource manager 321 may include, for example, a process manager (not illustrated), a memory manager (not illustrated), and a file system manager (not illustrated). The system resource manager 321 may perform the control, allocation, recovery, and/or the like of system resources. The device driver 323 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 323 may include an Inter-Process Communication (IPC) driver (not illustrated).

As one of various embodiments of the present disclosure, the display driver may control at least one display driver IC (DDI). The display driver may include the functions for controlling the screen according to the request of the application 370.

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. For example, when at least two displays 260 are connected, the screen may be differently configured or managed in response to the ratio of the screen or the action of the application 370. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a Basic Input/Output System (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 201) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 145) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 147) may include, for example, a preloaded application and/or a third party application. The applications 370 (e.g., the applications 147) may include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 310 may be implemented by instructions stored in a non-transitory computer-readable storage medium. When the instructions are executed by one or more processors (e.g., the application processor 210), the one or more processors may perform functions corresponding to the instructions. The non-transitory computer-readable storage medium may be, for example, the memory 230. At least a part of the programming module 310 may be implemented (e.g., executed) by, for example, the one or more processors. At least a part of the programming module 310 may include, for example, a module, a program, a routine, a set of instructions, and/or a process for performing one or more functions.

Figure 4A:
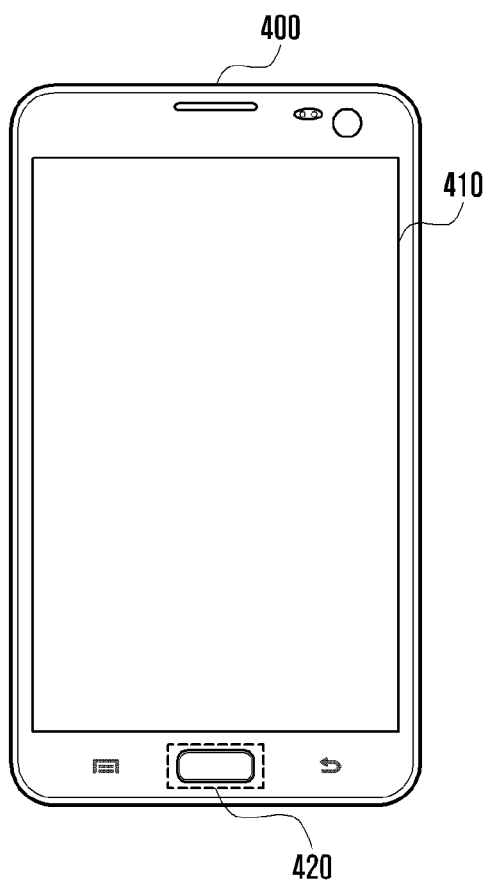
FIGS. 4A to 4C are diagrams illustrating examples of a front surface of an electronic device according to various embodiments.
Figure 4B:
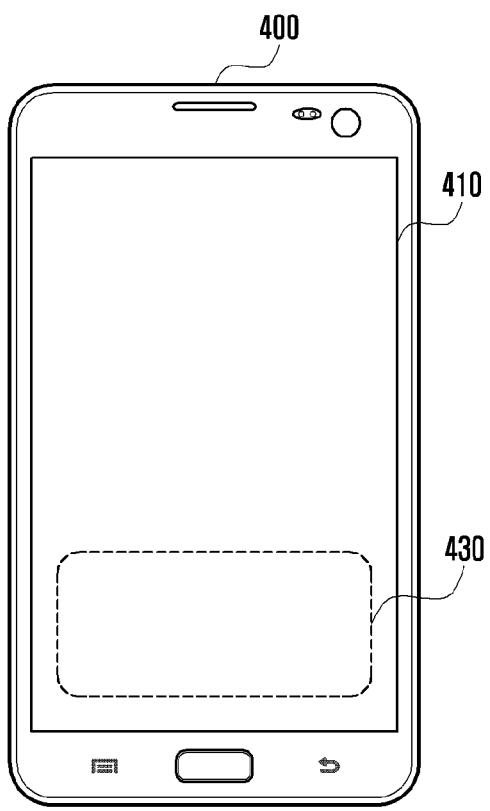
Figure 4C:
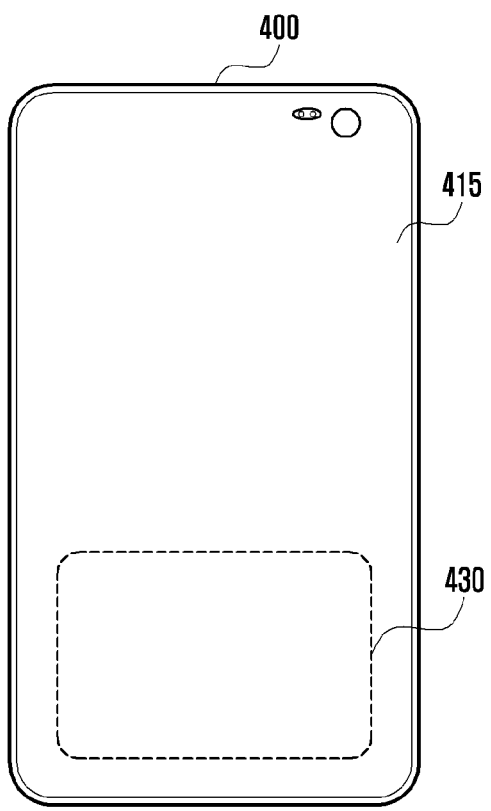

FIGS. 4A to 4C are diagrams illustrating examples of a front surface of an electronic device according to various embodiments.

As shown in FIG. 4A, the electronic device 400 (e.g., the electronic device 101 in FIG. 1 or the electronic device 201 in FIG. 2) may include a display 410 and an input button 420 on the front surface. A bezel area where the display is not formed may be provided outside the display 410. The input button 420 may be formed in the bezel area near the lower end of the display 410. One or more holes may be formed in the bezel area near the upper end of the display 410, and a camera, an illuminance sensor, etc. may be disposed in such holes.

According to one embodiment, the input button 420 may include a biometric sensor (e.g., a fingerprint sensor) for recognizing a user's biometric information (e.g., fingerprint information) in a part thereof. The biometric sensor may be used for sensing biometric information about a part of a user's body.

According to another embodiment, the biometric sensor (e.g., the fingerprint sensor) for recognizing biometric information (e.g., fingerprint information) may be formed on a rear surface of at least a portion of the display 410. As shown in FIG. 4B, a sensing area 430 for sensing biometric information may be formed in at least a portion of the display 410.

In case of the embodiment shown in FIG. 4A, the user may feel inconvenience of having to perform an input to the biometric sensor for biometric information sensing or authentication. In addition, because of the occupancy of the input button 420 in the front surface of the electronic device 400, the display 410 may be under a limitation in size. According to the embodiment shown in FIG. 4B, the above problems may be solved because the sensing area 430 of the biometric sensor is formed within an active area of the display 410.

According to an embodiment as shown in FIG. 4C, the biometric sensor may be disposed within the active area of the display 415, and also holes for the camera and illuminance sensor may be formed in the display 415. Therefore, the bezel area may be minimized, and the display 415 may occupy most of the front surface of the electronic device 400.

Hereinafter, the fingerprint sensor, which is one of typical biometric sensors, will be described as an example. However, various embodiments of the present disclosure are not limited to the fingerprint sensor, and any other biometric sensor capable of sensing various kinds of user biometric information such as iris, blood flow, body temperature, and pulse wave may be used.

In the present disclosure, the type of any biometric sensor equipped in the electronic device 400 is not limited. For example, the fingerprint sensor may have an optical type of acquiring a fingerprint by capturing a fingerprint image of a finger surface through a photosensitive diode, a capacitive type of acquiring a fingerprint by using the principle that ridges of a fingerprint touched to an electrode are detected and non-touched grooves between the ridges are not detected, or an ultrasonic type of acquiring a fingerprint by generating ultrasonic waves at a piezoelectric device and using a path difference of the ultrasonic waves reflected on the ridges and those reflected on the grooves of the fingerprint.

Additionally, in the present disclosure, the disposition type of the biometric sensor is not limited. For example, the fingerprint sensor may have an in/on-cover glass structure in which a sensing unit or electrode for fingerprint sensing is disposed on the surface of a cover glass through printing or etching, an over-display structure in which the sensing unit or electrode is disposed on a display panel, an under-display structure in which the sensing unit or electrode is disposed under the display panel, an in-display structure in which the sensing unit or electrode is disposed inside pixels or in a black matrix (BM) region between the pixels, or the like.

Figure 5:
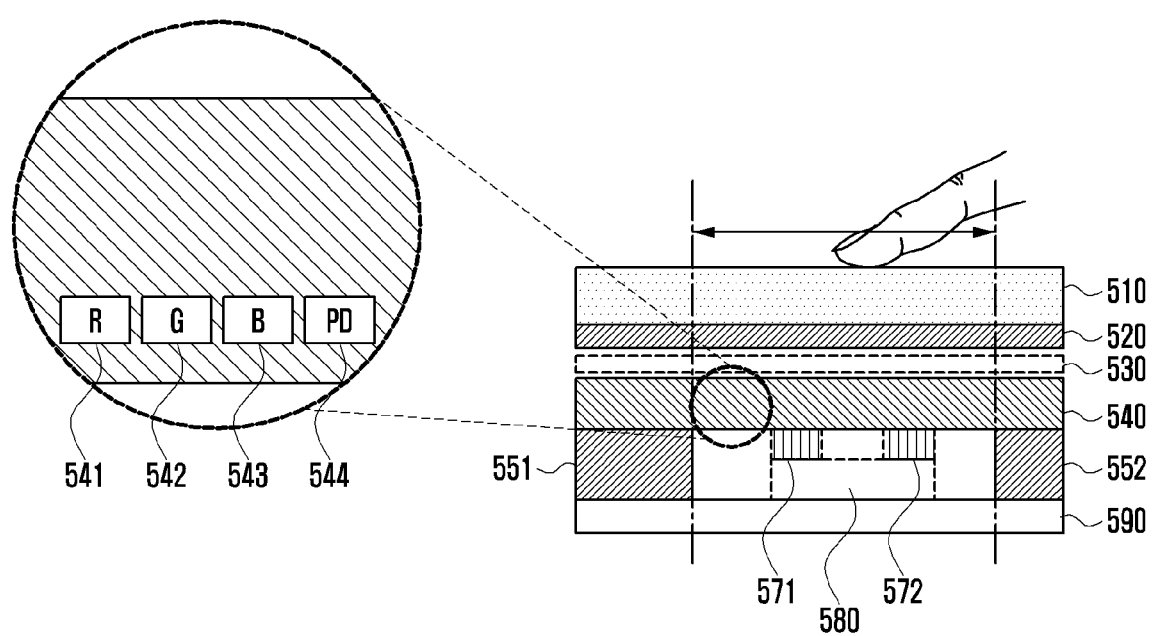
FIG. 5 is a diagram illustrating an example of a biometric sensor mounting structure of an electronic device according to various embodiments.

FIG. 5 is a diagram illustrating an example of a biometric sensor mounting structure of an electronic device according to various embodiments.

According to various embodiments, the electronic device (e.g., the electronic device 101 in FIG. 1, the electronic device 201 in FIG. 2, or the electronic device 400 in FIGS. 4A to 4C) may include a cover glass 510, a biometric sensor, a display 540, and a printed circuit board (PCB) 590. FIG. 5 is a partial cross-sectional view of the electronic device and shows a stack of some elements in the electronic device.

The cover glass 510 may be provided as the front surface of the electronic device and attached to the display 540 (or the biometric sensor) through an adhesive layer 520. According to embodiments, the biometric sensor may be disposed in a portion (e.g., one region or a plurality of regions) of the display 540 or in the entire area of the display 540 (e.g., the active area of the display).

The biometric sensor may be provided at various positions, and at least one biometric sensor may be provided at each position. According to one embodiment, the biometric sensor may be formed between the cover glass 510 and the adhesive layer 520. In this case, the biometric sensor may be formed by a pattern of transmission and reception electrodes of a capacitive type, and the electrodes may be transparent to increase the transmittance of light outputted from the display 540. Alternatively, the biometric sensor may be formed by an ultrasonic transmission and reception module.

According to another embodiment, the biometric sensor may be formed in a separate layer 530 interposed between the adhesive layer 520 and the display 540. According to still another embodiment, the biometric sensor (e.g., a photo detector (PD) 544) may be formed in at least a portion of a layer on which pixels (e.g., 541, 542 and 543) of the display 540 are formed. In this case, the biometric sensor may have an image sensor of an optical type, a transmission/reception module of an ultrasonic type, or a transmission/reception electrode pattern of a capacitive type.

According to yet another embodiment, the biometric sensor 580 may be formed under the display 540. In this case, the electronic device may further include frames 551 and 552 for securing a mounting space of the biometric sensor. The frames 551 and 552 may form at least a part of a sealing structure for protecting the biometric sensor 580. In addition, between the biometric sensor 580 and the display 540, elastic members 571 and 572 (e.g., sponge or rubber) for absorbing shock between the biometric sensor 580 and the display 540 or reducing (or preventing) foreign matter inflow may be formed.

According to one embodiment, the biometric sensor may include an image sensor. For example, when light (e.g. visible light, infrared light, or ultraviolet light) is emitted from a light source (e.g., the display or IR LED (not shown)) toward a user's fingerprint, the image sensor may detect the light reflected on the user's fingerprint.

According to various embodiments, the electronic device may include a transmitter (e.g., an IR LED, or an ultrasonic oscillator) (not shown) for transmitting a biometric sensing signal in the display 540. According to various embodiments, the transmitter may be formed at a position corresponding to the biometric sensor.

Figure 6:
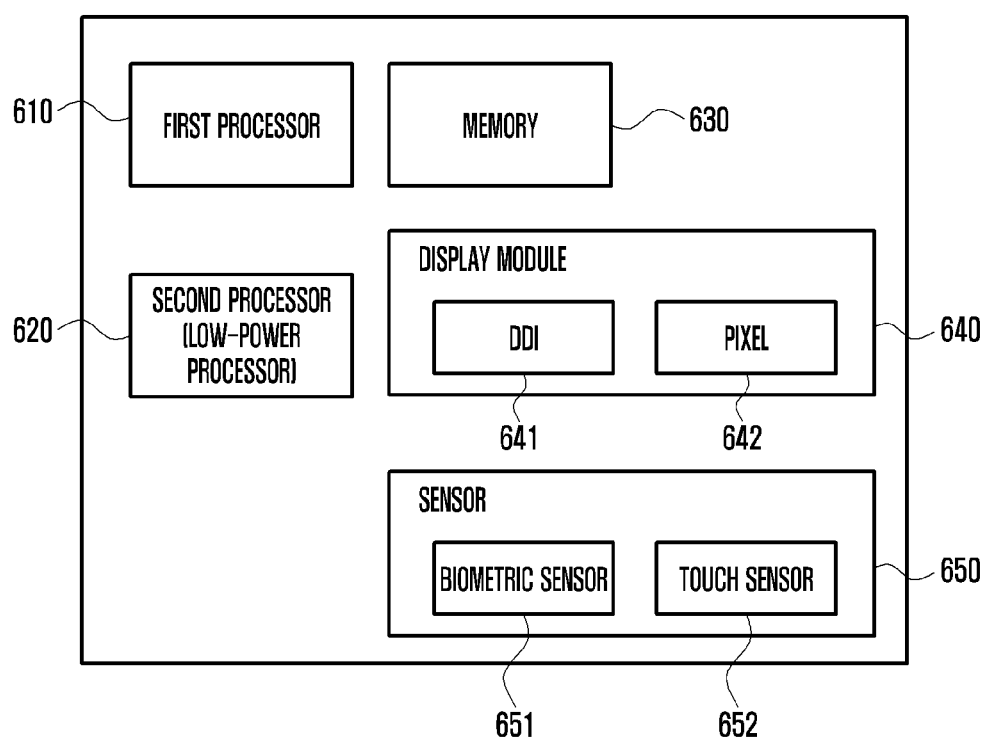
FIG. 6 is a block diagram illustrating an electronic device according to various embodiments.

FIG. 6 is a block diagram illustrating an electronic device according to various embodiments.

As shown in FIG. 6, the electronic device 600 (e.g., the electronic device 101 in FIG. 1, the electronic device 201 in FIG. 2, or the electronic device 400 in FIGS. 4A to 4C) may include at least one processor (e.g., a first processor 610 and/or a second processor 620), a memory 630, a display module 640, and at least one sensor 650.

According to an embodiment, the first processor 610 may control the overall operation of the electronic device 600. The second processor 620 (e.g., a low-power processor or a sensor HUB) may process sensor information acquired through the at least one sensor 650 or an input acquired from the user without waking up the first processor 610 when the electronic device 600 is in a sleep state. According to an embodiment, the second processor 620 may control the at least one sensor 650 (e.g., a biometric sensor 651 and/or a touch sensor 652) and/or the display module 640 separately from the first processor 610.

The memory 630 (e.g., the memory 130 in FIG. 1 or the memory 230 in FIG. 2) may include a normal region for storing a user application or the like, and a security region for storing security-sensitive information such as information for fingerprint sensing.

The display module 640 (e.g., the display 160 in FIG. 1, the display module 260 in FIG. 2, or the display 410 or 415 in FIGS. 4A to 4C) may include a plurality of pixels 642 and a display driver module 641 (also referred to as a display driver IC (DDI)) configured to control at least some of the plurality of pixels 642 to display information.

According to an embodiment, the sensor 650 (e.g., the sensor module 240 in FIG. 2) may include the biometric sensor 651 (e.g., a fingerprint sensor) for sensing a user's fingerprint on the display module 640, and/or the touch sensor 652 for sensing a user's touch on the display module 640. According to an embodiment, the biometric sensor 651 may include an optical type fingerprint sensor (e.g., an image sensor) that uses light outputted from the display module 640 as a light source.

According to various embodiments, in response to a user input, the at least one sensor 650 may drive the plurality of pixels 642 included in the display module 640 through the display driver module 641. According to an embodiment, the at least one sensor 650 may control the display module 640 as needed. For example, in order to acquire a user's biometric information, the biometric sensor 651 may control the display module 640 to emit light at the pixel 642.

Figure 7:
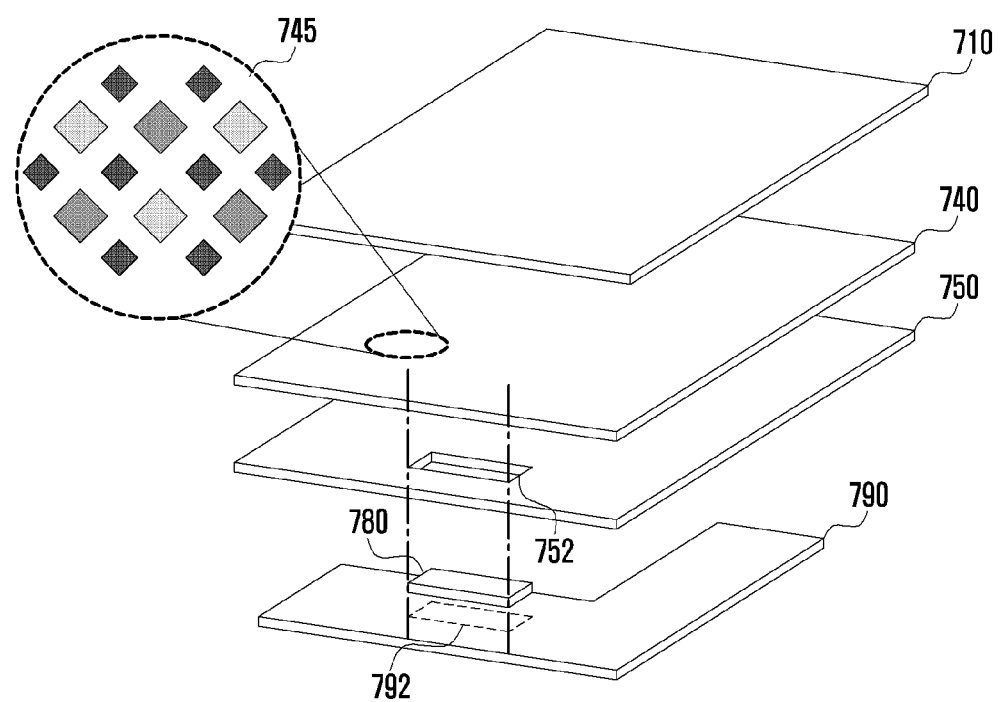
FIG. 7 is a diagram illustrating an example of a biometric sensor mounting structure of an electronic device according to various embodiments.

FIG. 7 is a diagram illustrating an example of a biometric sensor mounting structure of an electronic device according to various embodiments.

As shown in FIG. 7, a display (e.g., the display 160 in FIG. 1, the display module 260 in FIG. 2, or the display 410 or 415 in FIGS. 4A to 4C) of an electronic device (e.g., the electronic device 101 in FIG. 1, the electronic device 201 in FIG. 2, or the electronic device 400 in FIGS. 4A to 4C) may include a cover glass 710, a display panel 740, a display back panel 750, and a flexible printed circuit board (FPCB) 790, which are sequentially stacked.

The display panel 740 may include a plurality of display pixels 745 (e.g., the pixels 541, 542, and 543 in FIG. 5). The display back panel 750 may have a hole 752 formed in a portion thereof. The hole 752 may accommodate a biometric sensor 780 which is mounted on a certain region 792 of the upper surface of the FPCB 790. A specific region of the display panel 740 under which the biometric sensor 780 is disposed may be defined as a fingerprint sensing region.

The biometric sensor 780 may be configured to recognize a user's fingerprint, based on a signal (e.g., light, ultrasound) emitted from a transmitter (e.g., the display pixels 745, an IR LED, or an ultrasonic oscillator) included in the display panel 740. In this case, the arrangement (i.e., alignment) between the transmitter in the display panel 740 and the biometric sensor 780 may affect the sensing performance.

Figure 8:
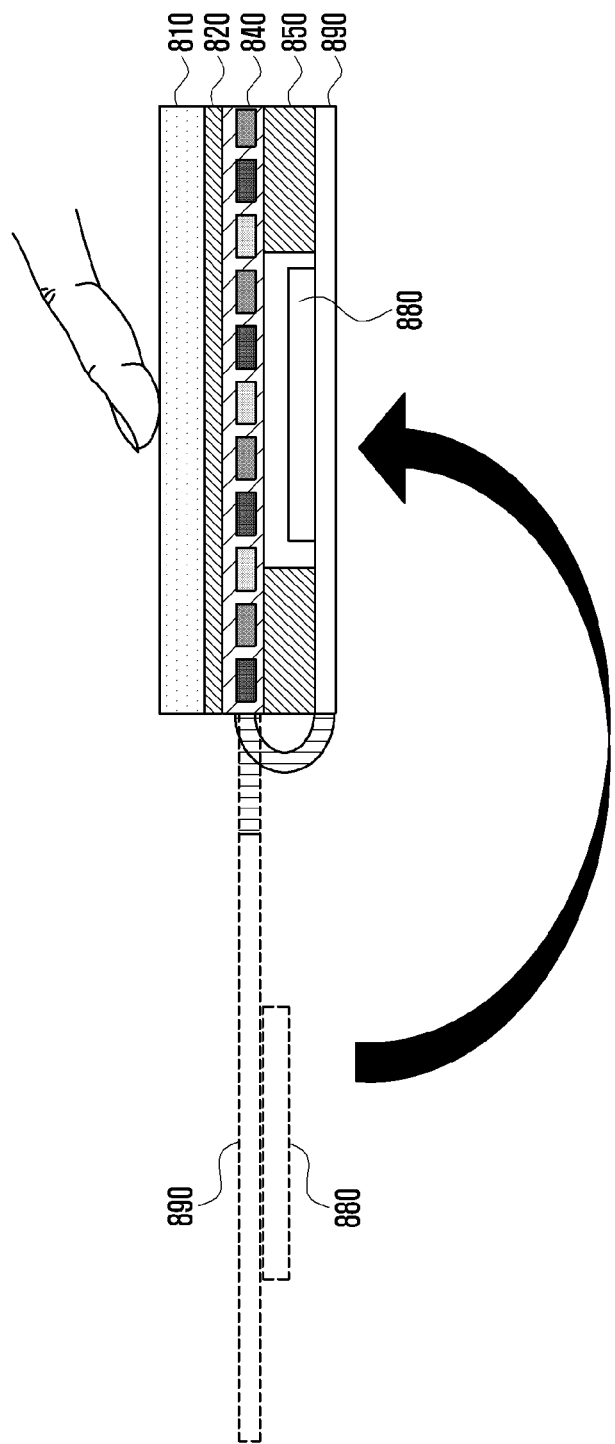
FIG. 8 is a diagram illustrating an example of a display structure according to various embodiments.

FIG. 8 is a diagram illustrating an example of a display structure according to various embodiments.

As shown in FIG. 8, a biometric sensor 880 (e.g., the biometric sensor 580 in FIG. 5, the biometric sensor 651 in FIG. 6, or the biometric sensor 780 in FIG. 7) may be mounted (i.e., surface mounting) on a display FPCB 890, which is bent such that the biometric sensor 880 is disposed under a display panel 840 (e.g., the display panel 740 in FIG. 7). Namely, the FPCB 890 is manufactured in a flat and bendable form. After the biometric sensor 880 is mounted on the FPCB 890, the FPCB 890 may be folded in two such that the biometric sensor 880 is disposed under the display panel 840.

In this structure, the position of the biometric sensor 880 may be changed from side to side due to a physical impact or the like. Namely, when the curvature of a bent portion of the FPCB 890 is varied, the position of the biometric sensor 880 may be somewhat changed. In this case, the position of the biometric sensor 880 may be misaligned from the previously defined sensing region; thus, there is a possibility of causing wrong recognition when biometric information is acquired.

Figure 9:
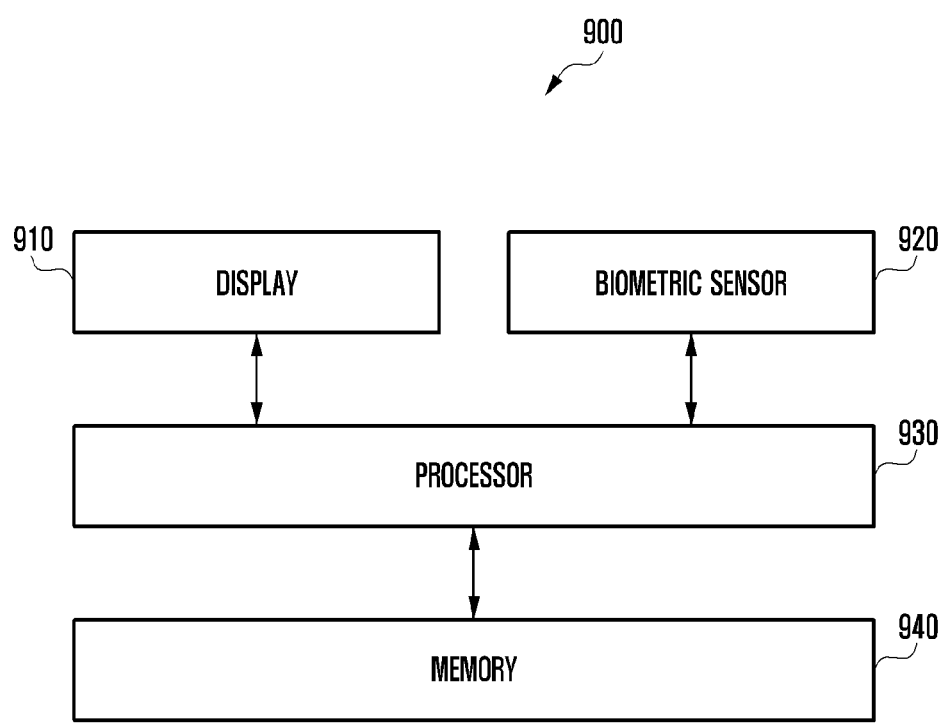
FIG. 9 is a block diagram illustrating an electronic device according to various embodiments.

FIG. 9 is a block diagram illustrating an electronic device according to various embodiments.

As shown in FIG. 9, the electronic device 900 according to various embodiments may include a display 910, a biometric sensor 920, a processor 930, and a memory 940. If necessary, some of these elements may be omitted or replaced by any equivalent elements. In addition, the electronic device 900 may include at least some of elements and/or functions of the electronic device 101 in FIG. 1, the electronic device 201 in FIG. 2, and the electronic device 600 in FIG. 6.

According to various embodiments, the display 910 is configured to display an image. The display 910 may be implemented as, but is not limited to, one of a liquid crystal display (LCD), a light-emitting diode (LED) display, an organic light-emitting diode (OLED) display, a micro electro mechanical system (MEMS) display, and an electronic paper display. The display 910 may include at least some of elements and/or functions of the display 160 in FIG. 1 and/or the display 260 in FIG. 2. Examples of a stack structure of the electronic device 900 including the display 910 are as described above with reference to FIGS. 5, 7, and 8.

According to various embodiments, the biometric sensor 920 (e.g., a fingerprint sensor) may acquire a user's biometric information (e.g., fingerprint information). For example, the biometric sensor 920 may be implemented as, but is not limited to, an optical type fingerprint sensor capable of acquiring a fingerprint image. Fingerprint information acquired by the biometric sensor 920 may be stored as image information and used for various kinds of authentication in the electronic device 900 through comparison with previously registered fingerprint information.

The biometric sensor 920 may be formed under at least a portion of the display 910 as described above with reference to FIGS. 4B and 4C and FIGS. 5, 7, and 8. Therefore, when a touch input using a user's finger occurs on a cover glass of the display 910, a touch sensor (e.g., the touch sensor 652 in FIG. 6) may acquire touch information, and the biometric sensor 920 may acquire biometric information at least simultaneously in part.

According to an embodiment, the biometric sensor 920 may be activated when a fingerprint recognition function is activated, for example, when an unlocking operation is performed or when a security-required application such as a message application is executed. According to another embodiment, the biometric sensor 920 may be activated when the fingerprint recognition function is activated and when a touch input occurs on a sensing region of the biometric sensor 920.

According to various embodiments, the processor 930 may be configured to control each element of the electronic device 900 and/or to perform operations or data processing regarding communication, and the processor 930 may include at least a part of the processor 120 in FIG. 1 and/or the processor 210 in FIG. 2. The processor 930 may be electrically connected to internal elements of the electronic device 900 such as the display 910, the biometric sensor 920, the memory 940, and the like.

The memory 940 may be configured to temporarily or permanently store digital data, and may include at least a part of the memory 130 in FIG. 1 and/or the memory 230 in FIG. 2. The memory 940 may store various instructions that may be executed in the processor 930. Such instructions may include control commands, such as arithmetic and logic operations, data movement, input/output, etc., which may be recognized by the processor 930, and may be defined on a framework stored in the memory 940. In addition, the memory 940 may store at least a part of the program module 310 shown in FIG. 3.

According to various embodiments, the processor 930 may perform various functions regarding operations and data processing which may be implemented in the electronic device 900. However, the following description will be focused on operations of identifying the position of the biometric sensor 920 by using an image acquired by the biometric sensor 920 and subsequently performed control operations. The operations of the processor 930 to be described hereinafter may be performed by loading the instructions stored in the memory 940.

The processor 930 may enable a sensing mode for sensing a change in position of the biometric sensor 920 in response to a predetermined event. Such an event for enabling the sensing mode may occur according to a user's input (e.g., setting a sensing mode to the on-state), occur at regular intervals (e.g., one month), occur when a function or application associated with the biometric sensor 920 is executed, or occur when wrong recognition of biometric information happens more than a certain number of times.

When the sensing mode is enabled, the processor 930 may activate pixels in at least a portion of the display 910. Here, the activated pixels may be predefined, for example, at the time of manufacture of the electronic device 900. In addition, the pixels activated in the sensing mode may be at least some pixels in a region from which the biometric sensor 920 acquires an image, namely, a fingerprint sensing region under which the biometric sensor 920 is located, and a part of peripheral regions thereof.

Before a change in position of the biometric sensor 920 occurs (e.g., at the time of manufacture of the electronic device), the electronic device 900 may store reference information for the coordinates of the pixels and a reference image acquired in advance through the biometric sensor 920 in the memory 940. Thereafter, if any change in position of the biometric sensor 920 occurs in the sensing mode, and when the corresponding pixels are activated according to the reference information and then an image is acquired through the biometric sensor 920, the acquired image may differ from the reference image stored in the memory 940.

When the at least one pixel is activated in the sensing mode, the processor 930 may acquire position information corresponding to at least one pixel through the biometric sensor 920. According to one embodiment, the biometric sensor 920 may acquire an image for the sensing region of the display 910, and the processor 930 may identify position information of the activated pixel on the acquired image.

Based on the identified position information, the processor 930 may identify the position of the biometric sensor 920. According to an embodiment, the processor 930 may identify the position of the biometric sensor 920 by comparing the position information of the pixel identified on the acquired image with the position information of the pixel on the previously stored reference information. For example, if there is no variation in the position information of the pixel between the acquired image and the reference image, the processor 930 may determine that a change in position of the biometric sensor 920 has not occurred. However, if there is variation in the position information of the pixel between the acquired image and the reference image, the processor 930 may determine that a change in position of the biometric sensor 920 has occurred.

When any change in position of the biometric sensor 920 occurs, the processor 930 may calculate a change amount of the position. Specifically, the change amount of the position may be calculated through a change in coordinates of pixels on the acquired image and the reference image.

If the change amount of the position of the biometric sensor 920 is within a predetermined range (e.g., smaller than a threshold value), the processor 930 may compensate the biometric information acquired by the biometric sensor 920, based on the change amount of the position of the biometric sensor 920. According to an embodiment, based on the change amount, the processor 930 may adjust the position of the acquired biometric information or adjust the position of the sensing region on the display 910. This will be described in detail with reference to FIGS. 13A and 13B.

If the change amount of the position of the biometric sensor 920 is within another predetermined range (e.g., equal to or greater than a threshold value), the processor 930 may provide information associated with the change amount of the position of the biometric sensor 920 through the display 910. For example, the processor 930 may display an alert message on the display 910 to notify difficulty in using a function of the biometric sensor 920 because of a change in position of the biometric sensor 920, restrict the use of a function or application associated with the biometric sensor 920, or propose another authentication manner. This will be described in detail with reference to FIG. 14.

Figure 10:
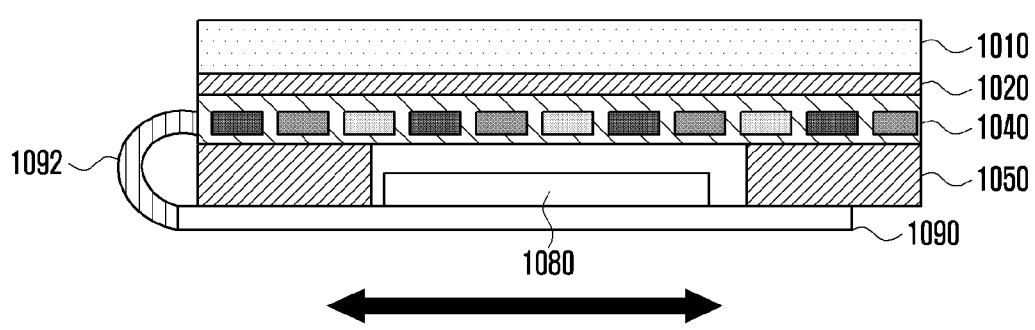
FIG. 10 is a diagram illustrating an example of a change in position of a biometric sensor according to various embodiments.

FIG. 10 is a diagram illustrating an example of a change in position of a biometric sensor according to various embodiments.

As shown in FIG. 10, a biometric sensor 1080 (e.g., the biometric sensor 580 in FIG. 5, the biometric sensor 651 in FIG. 6, the biometric sensor 780 in FIG. 7, or the biometric sensor 880 in FIG. 8) may be mounted (i.e., surface mounting) on a display FPCB 1090, which is bent such that the biometric sensor 1080 is disposed under a display panel 1040. In other words, the FPCB 1090 is manufactured in a flat and bendable form. After the biometric sensor 1080 is mounted on the FPCB 1090, the FPCB 1090 may be folded in two such that the biometric sensor 1080 is disposed under the display panel 1040.

This structure may cause a change in position of the biometric sensor 1080. For example, the curvature of a bent portion 1092 of the FPCB 1090 is varied because of a physical impact, and thereby a lower portion of the FPCB 1090 located under the display 1040 may be moved from side to side. Therefore, the biometric sensor 1080 mounted on the FPCB 1090 may be changed in position because of the movement of the FPCB 1090. In this case, the position of the biometric sensor 1080 may be misaligned from the previously defined sensing region on the display 1040, so that it may be difficult to acquire accurate biometric information.

Figure 11A:
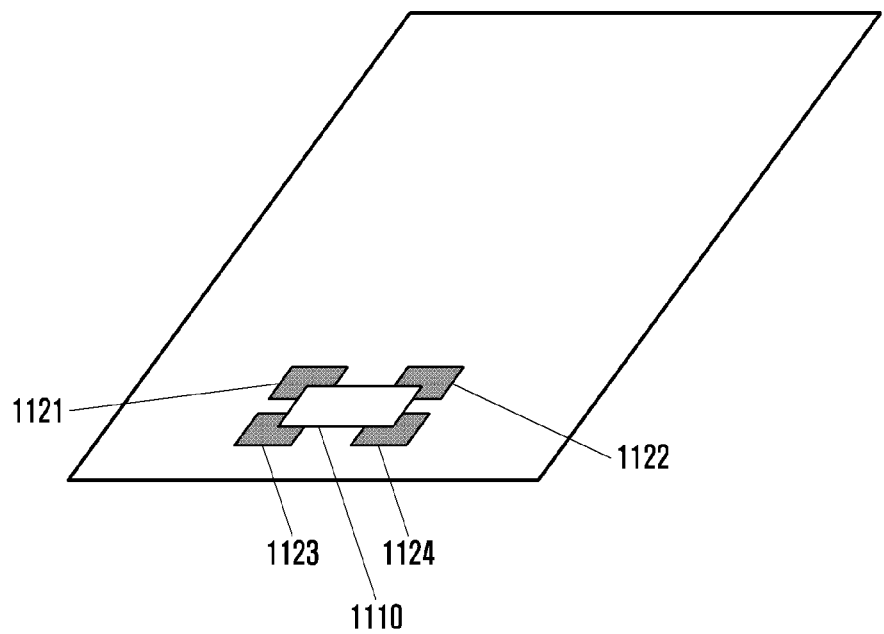
FIGS. 11A and 11B are diagrams illustrating examples of pixels used for identifying a position of a biometric sensor according to various embodiments.
Figure 11B:
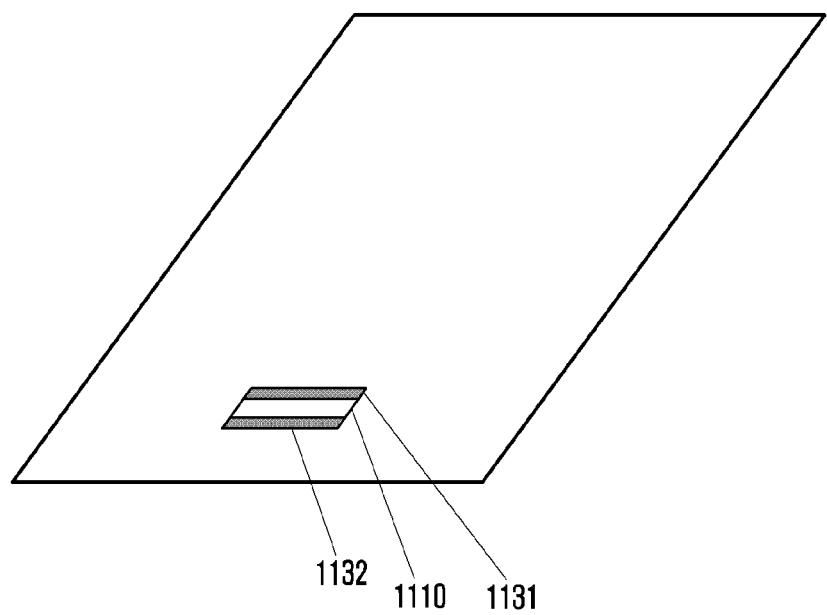

FIGS. 11A and 11B are diagrams illustrating examples of pixels used for identifying a position of a biometric sensor according to various embodiments.

According to various embodiments, the processor (e.g., the processor 930 in FIG. 9) may activate at least one pixel (e.g., the pixels 541, 542, and 543 in FIG. 5) included in at least a portion of the display (e.g., the display 910 in FIG. 9) under which the biometric sensor (e.g., the biometric sensor 920 in FIG. 9) is disposed. The activated pixels may be predetermined according to reference information.

According to an embodiment, among pixels of the display, at least one pixel located in an edge region adjacent to the sensing region under which the biometric sensor is disposed may be activated. According to various embodiments, the edge region may be defined to include the boundary of the sensing region 1110 at the outside of the sensing region 1110. For example, if the sensing region 1110 has a rectangular form, the edge region may be defined to correspond to at least one of corners or at least one of edges of the sensing region 1110.

As shown in FIG. 11A, the sensing region 1110 is provided in at least a portion of the display, and pixels 1121 to

1124 located at four corners of the sensing region 1110 may be activated. In other words, when the sensing mode is enabled, the pixels 1121 to 1124 may emit light, and the biometric sensor may acquire an image by receiving light emitted by the pixels 1121 to 1124. Alternatively, as shown in FIG. 11B, pixels located in upper and lower edge regions 1131 and 1132 of the sensing region 1110 may be activated. FIGS. 11A and 11B are exemplary only, and pixels to be activated may have various shapes such as a straight line, a curved line or a polygon, and they may also have various positions such as an edge, a corner, or a circumference of the sensing region 1110.

According to an embodiment, the processor may activate the selected pixels as shown in FIG. 11A, acquire an image through the biometric sensor, and check the position information of the biometric sensor to determine whether there is a change in position of the biometric sensor. If any change in position occurs (or if a change amount of position is within a predetermined range), the processor may activated the reselected pixels as shown in FIG. 11B and then check again the position information of the biometric sensor.

Figure 12:
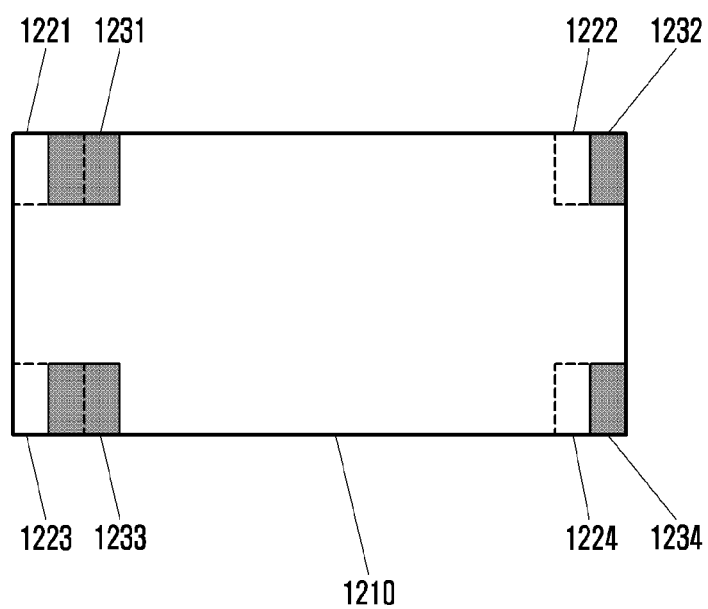
FIG. 12 is a diagram illustrating an example of an image acquired by a biometric sensor in case of a change in position of the biometric sensor according to various embodiments.

FIG. 12 is a diagram illustrating an example of an image acquired by a biometric sensor in case of a change in position of the biometric sensor according to various embodiments.

Because the biometric sensor (e.g., the biometric sensor 920 in FIG. 9) acquires an image of a fixed region, there will be no variation in the acquired image if the same pixels (e.g., 1121 to 1124 in FIG. 11A, or 1131 and 1132 in FIG. 11B) emit light and if there is no change in position of the biometric sensor. However, if there is any change in position of the biometric sensor, the acquired image may be different from the reference image (e.g., an image acquired before such a position change occurs).

If the pixels 1121 to 1124 located at four corners of the sensing region 1110 as shown in FIG. 11A are activated to emit light, and if the position of the biometric sensor is moved to the left, the positions 1221 to 1234 of the pixels may be moved to the right on the acquired image in comparison with the reference image as shown in FIG. 12. Like this, through a comparison between the predetermined reference image and the image obtained from the biometric sensor, the processor may determine whether a change in position of the biometric sensor occurs, and it may also identify a change amount of the position.

Figure 13A:
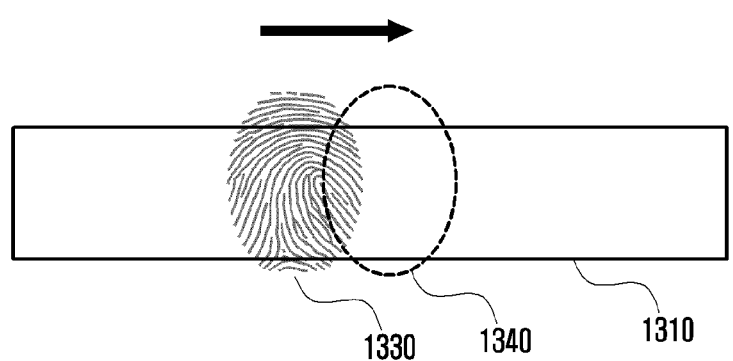
FIGS. 13A and 13B are diagrams illustrating examples of compensating biometric information according to various embodiments.
Figure 13B:
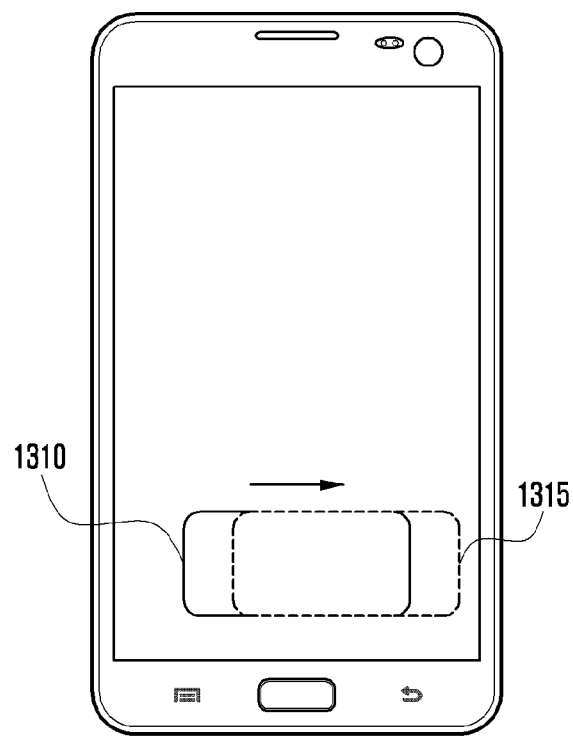

FIGS. 13A and 13B are diagrams illustrating examples of compensating biometric information according to various embodiments.

According to various embodiments, when the change amount of the position of the biometric sensor (e.g., 920 in FIG. 9) is within a predetermined range (e.g., smaller than a threshold value), the processor (e.g., 930 in FIG. 9) may compensate the biometric information acquired by the biometric sensor, based on the change amount. This means that the biometric information can be acquired when the change amount of position is small, so that a certain compensation is performed to increase a recognition rate.

As shown in FIG. 13A, the processor may adjust the position of the acquired biometric information, based on the change amount. As described above, when the position of the biometric sensor is changed, misalignment from a sensing region 1310 may be caused. In other words, the position of the acquired biometric information may be varied. For example, even if the user places a fingerprint 1330 in the center of the sensing region 1310 of the display, a fingerprint region may be shifted on the acquired image in case of a change in position of the biometric sensor. Thus, as indicated by reference numeral 1340, the processor may move the fingerprint region on the acquired image by the change amount of position of the biometric sensor so that the fingerprint is acquired at the intended position.

According to another embodiment, as shown in FIG. 13B, the processor may adjust the position of the sensing region 1310 to a new position 1315 on the display, based on the change amount of position of the biometric sensor. In this case, the fingerprint sensing region may be displayed at the new adjusted position 1315 on a biometric sensor related application. For example, for acquisition of biometric information, the processor may select again other pixels located at different positions corresponding to the change amount of position of the biometric sensor. Thus, even if the position of the biometric sensor is changed, the biometric sensor may acquire the same image as before the change.

Figure 14:
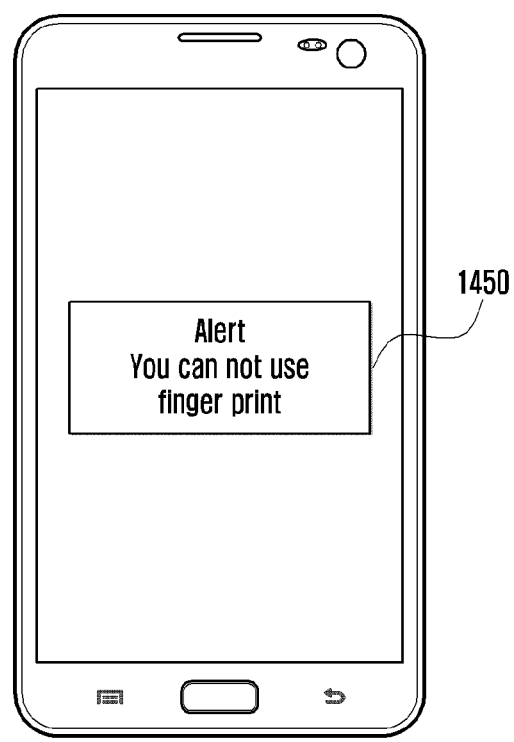
FIG. 14 is a diagram illustrating an example of displaying information associated with a change in position of a biometric sensor according to various embodiments.

FIG. 14 is a diagram illustrating an example of displaying information associated with a change in position of a biometric sensor according to various embodiments.

According to various embodiments, when the change amount of the position of the biometric sensor (e.g., 920 in FIG. 9) is within another predetermined range (e.g., equal to or greater than a threshold value), the processor (e.g., 930 in FIG. 9) may provide information associated with the change amount of the position of the biometric sensor through the display (e.g., 910 in FIG. 9). As shown in FIG. 14, the processor may display an alert message 1450 on the display to notify difficulty in using a function of the biometric sensor because of a change in position of the biometric sensor.

According to another embodiment, the processor may stop the execution of at least one function (or application) associated with the biometric sensor. For example, when fingerprint recognition is set as an unlocking means of the electronic device, the processor may stop the execution of the fingerprint recognition function and request the user to perform another unlock function such as a password input.

According to still another embodiment, the processor may select a function to be performed by further considering a pixel pitch as well as a change amount of position of the biometric sensor and a related threshold value. If the change amount of position of the biometric sensor is equal to or greater than the threshold value, the processor may check whether the change amount is a multiple of the pixel pitch. At this time, the processor may allow a certain error. In other words, if the change amount falls in a certain range from a multiple of the pixel pitch, this may be regarded as corresponding to a multiple. If the change amount is not a multiple of the pixel pitch, the processor may provide information associated with the change amount through the display as previously discussed in FIG. 14. On the contrary, if the change amount corresponds to a multiple of the pixel pitch, the processor may compensate the biometric information acquired by the biometric sensor as previously discussed in FIG. 13. For example, if the pixel pitch is 40 nm and the threshold value is 60 nm, and if the change amount of position of the biometric sensor exceeds 60 nm, the processor may provide related information (e.g., the alert message in FIG. 14). Further, if the change amount approaches 80 nm (or 120 nm, etc.), which is a multiple of the pixel pitch (i.e., 40 nm), the processor may compensate the biometric information. This is because, if the change amount of the position of the biometric sensor corresponds to a multiple of the pixel pitch, a shift in positions of pixels to be activated may be exactly matched and an error may be small.

According to various embodiments, an electronic device may comprise a display, a biometric sensor disposed in at least a portion of the display, and a processor electrically connected to the display and the biometric sensor. The processor may be configured to activate at least one pixel included in the at least a portion of the display; to acquire position information corresponding to the at least one pixel through the biometric sensor; and to identify a position of the biometric sensor disposed in the at least a portion of the display, based on the position information.

According to various embodiments, the processor may be further configured to compensate biometric information acquired by the biometric sensor, based on a change amount of the position of the biometric sensor, when the change amount is within a predetermined range.

According to various embodiments, the processor may be further configured to adjust the position of the acquired biometric information, based on the change amount.

According to various embodiments, the processor may be further configured to provide information associated with the change amount through the display when the change amount is within another predetermined range.

According to various embodiments, the processor may be further configured to stop at least one function associated with the biometric sensor when the change amount is within another predetermined range.

According to various embodiments, the processor may be further configured to activate at least one predefined pixel among pixels of the display.

According to various embodiments, the biometric sensor may be further configured to acquire an image of the at least a portion of the display when the at least one pixel is activated, and the processor may be further configured to identify position information of the activated pixel on the image acquired by the biometric sensor.

According to various embodiments, the processor may be further configured to identify the position of the biometric sensor by comparing the identified position information with pre-stored position information of pixels.

According to various embodiments, the processor may be further configured to activate, among pixels of the display, at least one pixel in an edge region adjacent to a region under which the biometric sensor is disposed.

According to various embodiments, the biometric sensor may be an optical fingerprint sensor disposed under the at least a portion of the display.

According to various embodiments, an electronic device may comprise a display; a biometric sensor disposed under at least a portion of the display; a memory; and a processor electrically connected to the display, the biometric sensor, and the memory. The processor may be configured to activate at least some pixels of the display, based on reference information previously stored in the memory, to acquire an image including the at least some pixels by using the biometric sensor, and to identify a position of the biometric sensor by comparing an image acquired by the biometric sensor with a reference image corresponding to the reference information.

According to various embodiments, the processor may be further configured to determine that the position of the biometric sensor is changed, when the acquired image is not identical with the reference image.

Figure 15:
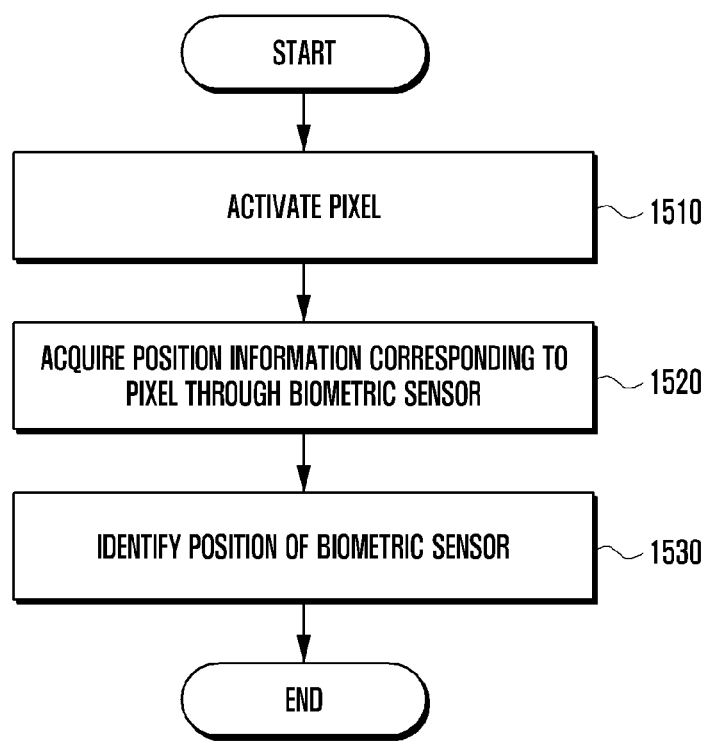
FIG. 15 is a flow diagram illustrating a method for identifying a position of a biometric sensor according to various embodiments.

FIG. 15 is a flow diagram illustrating a method for identifying a position of a biometric sensor according to various embodiments.

This method may be performed by the electronic device described above with reference to FIGS. 1 to 14, and the above-described technical features will be omitted below.

At operation 1510, the electronic device (e.g., the processor 930) may activate at least one pixel included in at least a portion of the display. According to an embodiment, the at least one pixel to be activated may be predefined, for example, before a change in position of the biometric sensor occurs (e.g., at the time of manufacture of the electronic device).

At operation 1520, the electronic device (e.g., the processor 930) may acquire position information corresponding to the at least one pixel through the biometric sensor. According to an embodiment, the electronic device may compare a pre-stored reference image with an image acquired by the biometric sensor and, based on the position of the activated pixel in such images, acquire the position information of the biometric sensor.

At operation 1530, the electronic device (e.g., the processor 930) may identify the position of the biometric sensor disposed in the at least a portion of the display, based on the acquired position information.

Figure 16:
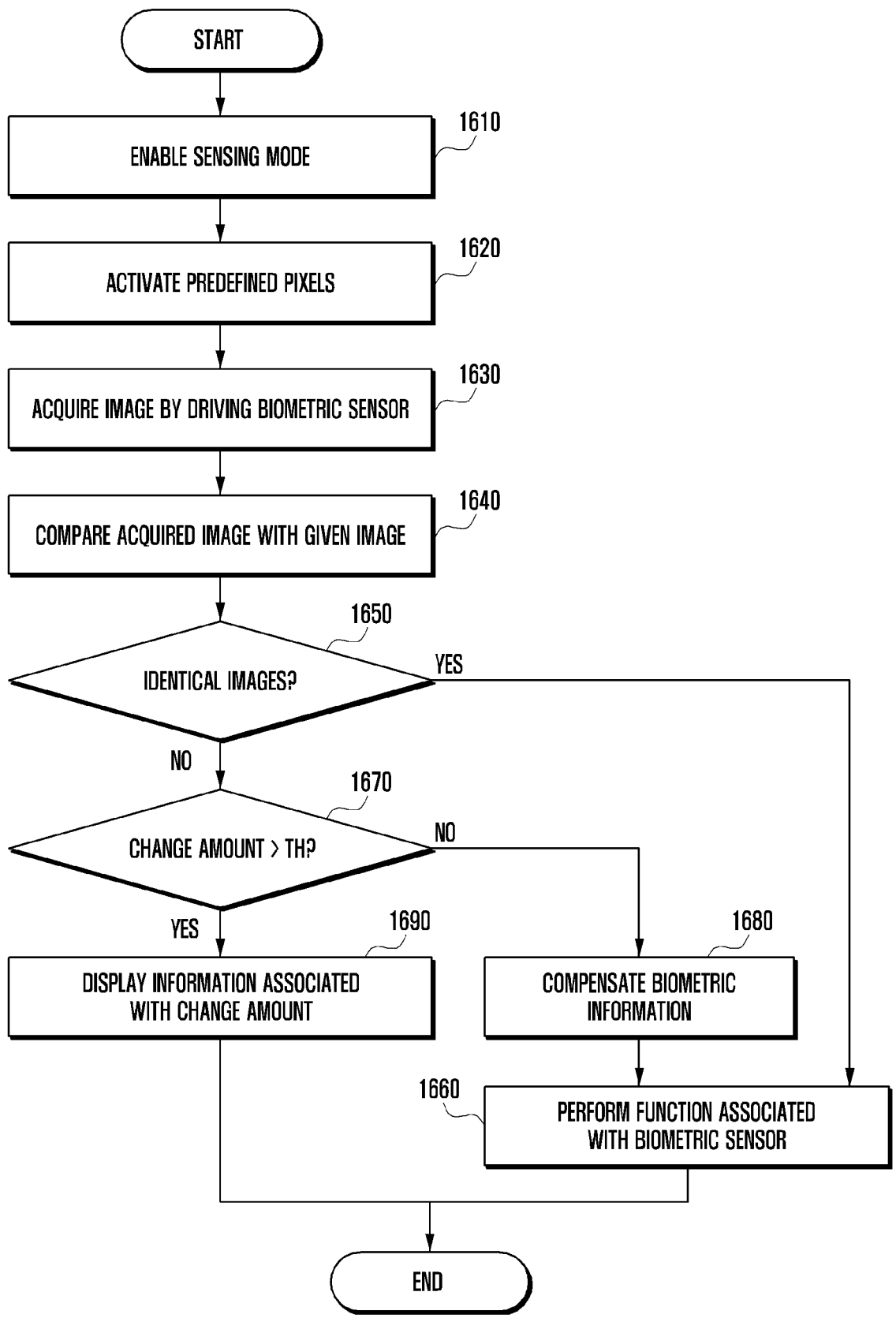
FIG. 16 is a flow diagram illustrating a method for identifying a position of a biometric sensor according to various embodiments.

FIG. 16 is a flow diagram illustrating a method for identifying a position of a biometric sensor according to various embodiments.

At operation 1610, the electronic device (e.g., the processor 930) may enable a sensing mode for sensing a change in position of the biometric sensor in response to a predetermined event. According to an embodiment, this event for enabling the sensing mode may occur according to a user's input (e.g., setting a sensing mode to the on-state), occur at regular intervals (e.g., one month), occur when a function or application associated with the biometric sensor is executed, or occur when wrong recognition of biometric information happens more than a certain number of times.

At operation 1620, the electronic device (e.g., the processor 930) may activate pixels in at least a portion of the display. Here, the activated pixels may be predefined, for example, at the time of manufacture of the electronic device before a change in position of the biometric sensor occurs. In addition, the pixels to be activated may be at least some pixels in a region from which the biometric sensor acquires an image, namely, in a fingerprint sensing region under which the biometric sensor is located, and in a part of peripheral regions thereof. Examples of the activated pixels are discussed above in FIGS. 11A and 11B.

At operation 1630, the electronic device (e.g., the processor 930) may acquire an image by driving the biometric sensor. The image acquired by the biometric sensor may include an image of at least some of the activated pixels.

At operation 1640, the electronic device (e.g., the processor 930) may compare the image acquired through the biometric sensor with a given image (e.g., a pre-stored reference image).

If it is determined at operation 1650 that the acquired image is identical with the given image, this means that a change in position of the biometric sensor has not occurred. Therefore, at operation 1660, the electronic device (e.g., the processor 930) may continuously perform a function associated with the biometric sensor.

On the contrary, if the acquired image is not identical with the given image, the electronic device (e.g., the processor 930) may check a change amount of the position of the biometric sensor, based on a difference between the images, and then determine at operation 1670 whether the change amount is greater than a threshold value.

If the change amount of the position of the biometric sensor is smaller than the threshold value, at operation 1680 the electronic device may compensate the biometric information acquired through the biometric sensor. This has been previously described with reference to FIGS. 13A and 13B.

On the contrary, if the change amount of the position of the biometric sensor is equal to or greater than the threshold value, the electronic device may provide information associated with the change amount at operation 1690. This has been previously described with reference to FIG. 14.

According to various embodiments, a method for identifying a position of a biometric sensor in an electronic device may comprise activating at least one pixel included in the at least a portion of a display; acquiring position information corresponding to the at least one pixel through the biometric sensor; and identifying the position of the biometric sensor disposed in the at least a portion of the display, based on the position information.

According to various embodiments, the method may further comprise compensating biometric information acquired by the biometric sensor, based on a change amount of the position of the biometric sensor, when the change amount is within a predetermined range.

According to various embodiments, the compensating biometric information may include adjusting the position of the acquired biometric information, based on the change amount.

According to various embodiments, the method may further comprise providing information associated with the change amount through the display when the change amount is within another predetermined range.

According to various embodiments, the method may further comprise stopping at least one function associated with the biometric sensor when the change amount is within another predetermined range.

According to various embodiments, the acquiring position information may include acquiring an image of the at least a portion of the display when the at least one pixel is activated, and identifying position information of the activated pixel on the image acquired by the biometric sensor.

According to various embodiments, the acquiring position information may further include identifying the position of the biometric sensor by comparing the identified position information with pre-stored position information of pixels.

According to various embodiments, the activating at least one pixel may include activating, among pixels of the display, at least one pixel in an edge region adjacent to a region under which the biometric sensor is disposed.

While the present disclosure has been particularly shown and described with reference to exemplary embodiments thereof, it is clearly understood that the same is by way of illustration and example only and is not to be taken in conjunction with the present disclosure. It will be understood by those skilled in the art that various changes in form and details may be made therein without departing from the subject matter and scope of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a display;
   a biometric sensor disposed in the display; and
   a processor operatively coupled to the display and the biometric sensor,
   wherein the processor is configured to:
      activate at least one pixel included in the display,
      acquire position information corresponding to the at least one pixel through the biometric sensor, and
      identify a position of the biometric sensor disposed in the display based on the position information.

2. The electronic device of claim 1, wherein the processor is further configured to compensate biometric information acquired by the biometric sensor based on a change amount of the position of the biometric sensor when the change amount is within a predetermined range.

3. The electronic device of claim 2, wherein the processor is configured to adjust a position indicated by the acquired biometric information based on the change amount.

4. The electronic device of claim 2, wherein the processor is further configured to provide information associated with the change amount through the display when the change amount is within another predetermined range.

5. The electronic device of claim 2, wherein the processor is further configured to stop at least one function associated with the biometric sensor when the change amount is within another predetermined range.

6. The electronic device of claim 1, wherein the processor is configured to activate at least one predefined pixel among pixels of the display.

7. The electronic device of claim 6, wherein:
   the biometric sensor is further configured to acquire an image of the display when the at least one predefined pixel is activated, and
   the processor is further configured to identify the position information of the activated at least one predefined pixel based on the image acquired by the biometric sensor.

8. The electronic device of claim 7, wherein the processor is configured to identify the position of the biometric sensor by comparing the identified position information with pre-stored position information of pixels.

9. The electronic device of claim 6, wherein the processor is configured to activate, among pixels of the display, at least one pixel in an edge region adjacent to a region under which the biometric sensor is disposed.

10. The electronic device of claim 1, wherein the biometric sensor is an optical fingerprint sensor disposed under the display.

11. A method for identifying a position of a biometric sensor in an electronic device, the method comprising:
   activating at least one pixel included in a display of the electronic device;
   acquiring position information corresponding to the at least one pixel through the biometric sensor; and
   identifying the position of the biometric sensor disposed in the display based on the position information.

12. The method of claim 11, further comprising compensating biometric information acquired by the biometric sensor based on a change amount of the position of the biometric sensor when the change amount is within a predetermined range.

13. The method of claim 12, wherein compensating the biometric information comprises adjusting a position indicated by the acquired biometric information based on the change amount.

14. The method of claim 12, further comprising providing information associated with the change amount through the display when the change amount is within another predetermined range.

15. The method of claim 12, further comprising stopping at least one function associated with the biometric sensor when the change amount is within another predetermined range.

16. The method of claim 11, wherein acquiring the position information comprises:
- acquiring an image of the display when the at least one pixel is activated; and
- identifying the position information of the activated at least one pixel based on the image acquired by the biometric sensor.

17. The method of claim 16, wherein acquiring the position information further comprises identifying the position of the biometric sensor by comparing the identified position information with pre-stored position information of pixels.

18. The method of claim 11, wherein activating the at least one pixel includes activating, among pixels of the display, at least one pixel in an edge region adjacent to a region under which the biometric sensor is disposed.

19. An electronic device comprising:
- a display;
- a biometric sensor disposed under the display;
- a memory; and
- a processor electrically connected to the display, the biometric sensor, and the memory,
- wherein the processor is configured to:
  - activate one or more pixels of the display based on reference information previously stored in the memory,
  - acquire an image including the one or more pixels using the biometric sensor, and
  - identify a position of the biometric sensor by comparing the image acquired using the biometric sensor with a reference image corresponding to the reference information.

20. The electronic device of claim 19, wherein the processor is further configured to determine that the position of the biometric sensor is changed when the acquired image is different than the reference image.

* * * * *